United States Patent Office 3,520,316
Patented July 14, 1970

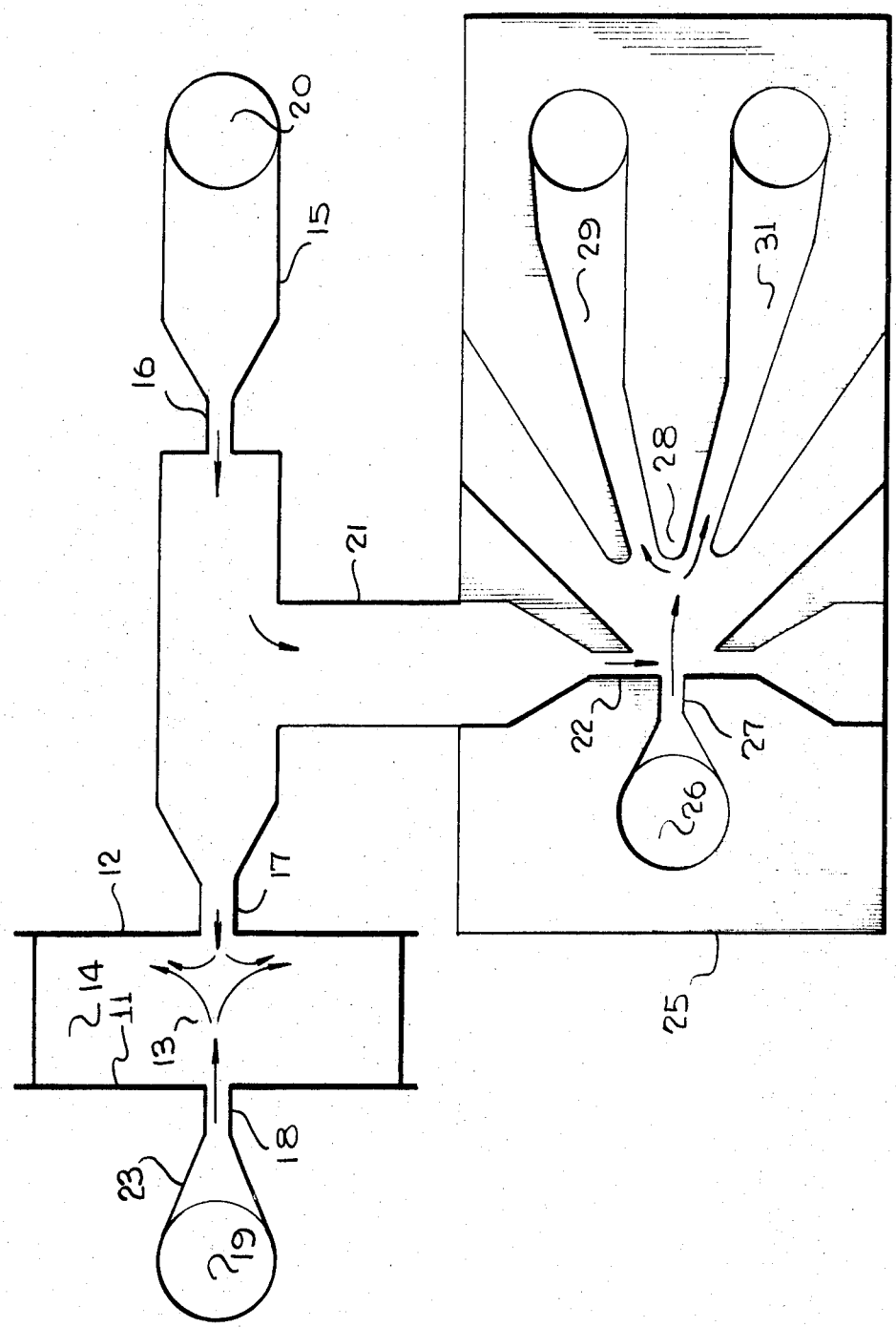

3,520,316
PRESSURE-TO-PRESSURE TRANSDUCER
John R. Colston, Silver Spring, Md., assignor to Bowles Engineering Corporation, Silver Spring, Md., a corporation of Maryland
Filed Dec. 12, 1963, Ser. No. 330,030
Int. Cl. F16c 1/20
U.S. Cl. 137—81.5                6 Claims

ABSTRACT OF THE DISCLOSURE

A transducer establishes the pressure of a first fluid as a proportional function of the pressure of a second fluid. The first fluid is supplied at constant pressure to a chamber from which it is continuously bled, establishing an internal static chamber pressure as a proportional function of the rate of bleed. A source of the second fluid under pressure impedes the bleed rate from the chamber as a proportional function of the second fluid pressure. The static pressure in the chamber is thus monitored as a proportional function of the second fluid pressure.

---

The present invention relates to transducers, and more particularly, to a pure fluid pressure transducer for converting pressures in one type of fluid to pressure in a different type of fluid and/or converting pressures variable about a given pressure level to pressures variable about a greatly different level.

Transducers have long been available for converting pressure in one type of fluid to pressure in another type of fluid or converting from pressures which vary about a quiescent pressure at one level to pressures which vary about a quiescent pressure at another level. Usually, these transducers employ a diaphragm for sensing the pressure variations in a first fluid, the diaphragm exerting a force on a beam. The beam is subsequently balanced by pneumatic pressure, the pneumatic pressure required being a function of the pressure in the first fluid. The pneumatic pressure may then be employed in a pneumatic system for purposes of control, etc.

The above system employs various mechanical, moving parts, such as the diaphragm, beam, linkages, etc., and consequently, is subject to wear and is expensive to manufacture.

The present invention, generally stated, utilizes moving streams of fluid only, and thus obviates the disadvantages attendant upon the pressure transducers heretofore known.

Accordingly, it is an object of the present invention to provide a transducer for fluid pressure having no moving parts other than moving fluid streams.

Another object of the present invention is the provision of a pressure transducer which may be economically manufactured.

A further object of the present invention is to provide a pressure transducer which is not subject to deterioration or wear due to long periods of use.

Yet another object of the present invention is to provide a transducer having a rapid response to changes in pressure in one type of fluid to produce a pressure change in another type of fluid.

It is another object of the present invention to provide a transducer which can produce a pressure in a relatively low-pressure system that is proportional to the pressure in a high-pressure system or vice versa.

A still further object of the present invention is the provision of a pressure-to-pressure transducer well suited for use with fluid amplifier systems.

The above and still further objects, features and advantages of the present invention will become apparent upon consideration of the following detailed description of one specific embodiment thereof, especially when taken in conjunction with the accompanying drawing, wherein:

The single figure of the accompanying drawing is a flow diagram of the transducer of the present invention.

Referring now to the single figure of the accompanying drawing, there is illustrated a transducer generally designated by the reference numeral 10. The transducer 10 is provided with a measuring region 13 defined by a pair of walls 11, 12. Region 13 may be vented via a passage 14 defined by walls 11 and 12 to ambient pressure or other suitable pressure reference. As will be understood, the showing of the walls 11 and 12, which define the region 13, is diagrammatic in the figure.

The region 13 is confined between top and bottom walls parallel to the page of the drawing to insure that streams of fluid issued from opposed orifices 17 and 18, formed in the walls 12 and 11, respectively, interact as will be explained more fully subsequently. Only a bottom wall 13a is illustrated.

A source 20 of fluid under pressure is provided, the source 20 being hereinafter described as a source of pressurized air for purposes of explanation only.

A conduit 15 extends between the source 20 and the orifice 17 and has a restriction 16 formed therein. The restriction 16 serves as a fluid resistor and may take other forms of fluid resistance.

A second source 19 of fluid under pressure is provided and is connected to the orifice 18 via a fluid passage 23. The source of pressure 19 may provide a fluid under pressure which is different from that of the fluid provided by the source 20. The conduit or discharge means 17 and the discharge means 18 are in opposed, facing relationship and are in axial alignment. Thereby, the fluids from the sources 19 and 20 impact directly against each other in the region 13 and are vented freely from the region 13 through the vent regions 14.

A branch conduit 21 communicates with the conduit 15 between the restriction 16 and the orifice 17, branch conduit 21 terminating in a nozzle 22 forming a part of a fluid amplifier generally designated 25. Fluid amplifier 25 may be of a known type in which pressurized fluid is supplied through a passage 26 to a power nozzle 27 towards a divider 28, output passages 29 and 31 being positioned along opposite sides of the divider 28. Normally, the fluid from nozzle 27 may divide equally between passages 29 and 31. Upon the issuance of control fluid through control nozzle 22, and into contact with the stream of fluid issued by the power nozzle 27, the latter stream is deflected as a function of the momentum of the control stream so that varying proportions of the power stream, greater than half of the stream, flows to the output passage 31. To the extent that an increased proportion of fluid flows to passage 31, a decreased proportion flows to passage 29 so that the pressures, mass flows or energy delivered to the two output passages 29 and 31 vary differentially as a function of the control fluid flow issued by the control nozzle 22. An indicating instrument or control device, etc., may be connected to one or the other of the passages 29 and 31 or preferably across both output passages to utilize the changes in pressure, flow, etc. to the maximum extent.

In order to understand the operation of the system, certain parameters must first be considered. The pressure provided at the orifice 17 must always be greater than the pressure developed at the orifice 18 by the fluid issuing from the orifice 18. This is to insure that none of the fluid issuing from orifice 18 enters the passage 16. For instance, the fluid supplied by the source 20 may be air while the fluid supplied by the source 19 may be steam. It is wished to prevent the steam from entering passage 16 so that water does not enter the air system where it might affect the operation of the air system. By maintaining the pressure at the orifice 17 always higher than the pressure that can be developed thereat by the fluid from the orifice 18, air always flows out of the passage 16 and prevents steam from entering it.

The pressure at any instant in the passage 21 is a function of the pressure of the fluid from source 20, the pressure drop produced by restriction 16 and the impedance to flow out of orifice 17 developed thereat by the fluid from the orifice 18. In the absence of fluid flow from orifice 18, the pressure in passage 21 is at a minimum since the fluid in passage 16 is free to flow into the region 13 which is nominally at ambient or atmospheric pressure. Upon flow from orifice 18, a pressure is established at the orifice 17 which opposes flow therefrom and the pressure in the passage 21 rises to the extent that flow has been decreased from the orifice 17. Thus, as the pressure of the flow from orifice 18 rises and falls, the pressure in the passage 21 rises and falls. The fluid flow from the control nozzle 22 of amplifier 25 also rises and falls and the stream is deflected more or less, respectively, toward the passage 31. If the meter connected across the passages 29 and 31 is initially calibrated in terms of the fluid pressure of the fluid supplied by the source 19, then the meter indicates the pressure of that fluid as its pressure fluctuates.

The above example is of a case where the two fluids are different but are at pressures of the same order of magnitude. If the fluid pressures are of different orders of magnitudes, for instance, the fluid from source 19 is at the higher pressure, the region 13 may be wider so that the pressure of the stream from the orifice 18 is attenuated in flowing through the region 13 before it reaches the orifice 17. Alternatively, the orifices may be misaligned (although still parallel) so that the orifice 17 sees only a region of the stream from orifice 18 that is displaced from the center of the stream. The pressure in the periphery of a stream is far more rapidly attenuated than the pressure in the center of the stream so that matching of the pressures in the system is more easily accomplished than with axially aligned orifices. On the other hand, if the source 20 supplies fluid at a higher pressure than source 19, the orifices 17 and 18 may be moved closer together and the orifice 17 may be formed as a restriction to further reduce the pressure of the fluid in the region 13 to a level more nearly the same as that of the fluid supplied by source 19.

There has been provided a pressure-to-pressure transducer having no solid moving parts, but having only moving fluid. The transducer herein disclosed may be readily fabricated, is economical, and is well suited for use with pure fluid amplifier systems.

While I have described and illustrated one specific embodiment of my invention, it will be clear that variations of the details of construction which are specifically illustrated and described may be resorted to without departing from the true spirit and scope of the invention as defined in the appended claims.

I claim:

1. A transducer for establishing a pressure of a first fluid which varies as a function of variations in pressure of a second fluid, a chamber having first, second and third openings therein, three pressure dropping members, each of said openings including a different one of said members, a first source of fluid under pressure connected to supply to said chamber through said first opening a first fluid of such a pressure that fluid issues from said chamber concurrently through both said second and third openings over the entire range of operation of said transducer, a vented chamber, a second source of fluid for issuing said second fluid in a stream across said vented chamber toward said second opening and means connected to said third opening for sensing the pressure of said first fluid in said first-mentioned chamber.

2. The combination according to claim 1 wherein said first and second fluids are different types of fluid.

3. A transducer for establishing a pressure of a first fluid which varies as a function of variations in pressure of a second fluid, a chamber having first, second and third openings therein, three pressure dropping members, each of said openings including a different one of said members, a first source of fluid under pressure connected to supply to said chamber through said first opening a first fluid of such a pressure that fluid issues from said chamber concurrently through both said second and third openings over the entire range of operation of said transducer, a second source of variable pressure fluid for issuing a stream of said second fluid toward said second opening to vary the flow rate of fluid through said second opening as a function of said variable pressure and means connected to said third opening for sensing the pressure of said first fluid in said chamber.

4. The combination according to claim 3 further comprising a pure fluid proportional amplifier comprising at least two output passages, means for issuing of power stream toward said output passages and control means for developing a variable differential in pressure across said power stream to vary the properties of fluid supplied to said output passages as a continuously variable function of the differential in pressure and means connecting said third opening to said control means so that said pressure differential varies as a function of fluid pressure in said chamber.

5. The method of establishing a static pressure which is a function of the dynamic pressure of a flowing stream comprising supplying to a chamber a pressurized fluid, continuously bleeding fluid from said chamber through a first opening at a rate to establish in the chamber a static pressure less than the total pressure of the fluid supplied to the chamber, varying the rate of bleed of fluid from said first opening as a function of the rate of flow of said flowing stream continuously bleeding fluid from said chamber through a second opening in said chamber to determine the static pressure in the chamber.

6. Fluid apparatus for sensing the presence of a first fluid jet stream of predetermined energy, which comprises:

(a) a fluid orifice having a predetermined flow area which is located in alignment with the first fluid stream for receiving same;

(b) a fluid recovery channel of predetermined volume connected to said fluid orifice;

(c) fluid static pressure sensing means directly connected to said fluid recovery channel by means of a closed conduit, said sensing means being in at least a first or a second signal condition in response to a fluid static pressure of a first or a second value, respectively, in said fluid recovery channel; and (d) a source of pressurized fluid connected to said fluid recovery channel for causing a second fluid jet stream to issue from said fluid orifice in opposition to the first fluid jet stream, where the energy of said second fluid jet stream is such, relative to the energy of the first fluid stream, to said recovery channel predetermined volume, and to said predetermined flow area, that fluid in said fluid recovery channel at any time substantially comes only from said source and is at either said one or said second static pressure value in response to the respective absence or presence of the first fluid jet stream so that fluid from said second fluid source is the sole fluid acting on said pressure sensing means.

References Cited

UNITED STATES PATENTS

| | | | |
|---|---|---|---|
| 3,068,880 | 12/1962 | Riordan | 137—81.5 |
| 3,080,886 | 3/1963 | Severson | 137—81.5 |
| 3,117,593 | 1/1964 | Sowers | 137—81.5 X |
| 3,128,040 | 4/1964 | Norwood. | |
| 3,159,168 | 12/1964 | Reader | 137—81.5 |

FOREIGN PATENTS 913,848  12/1962  Great Britain.

SAMUEL SCOTT, Primary Examiner

U.S. Cl. X.R.

235—201